(No Model.) 2 Sheets—Sheet 1.
M. O. MEACHAM.
RECLEANING ATTACHMENT FOR CLOVER HULLERS.
No. 276,851. Patented May 1, 1883.
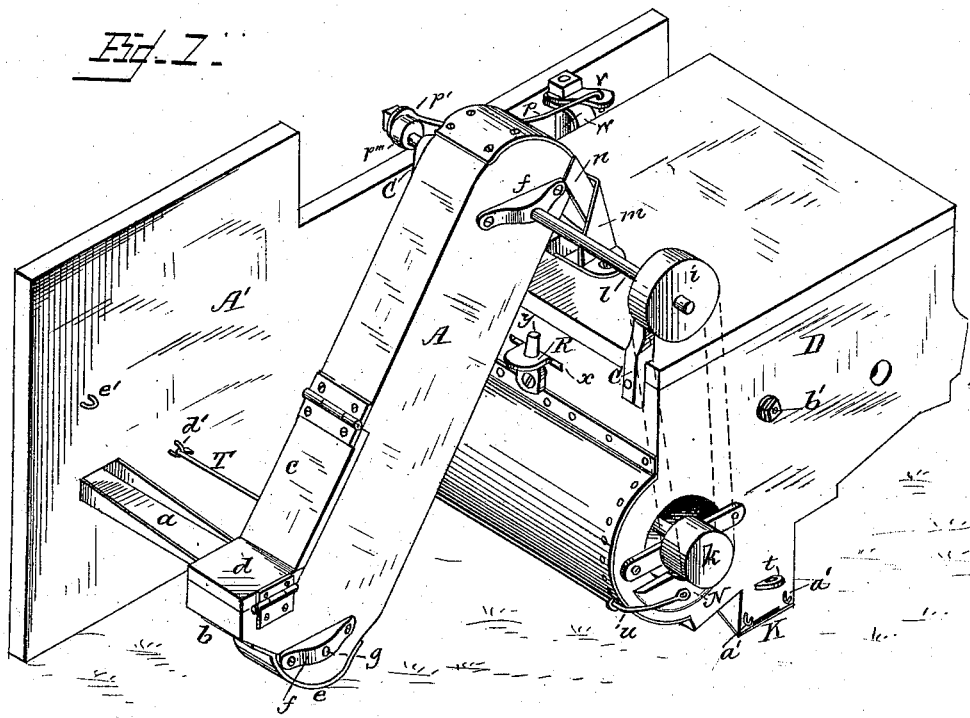
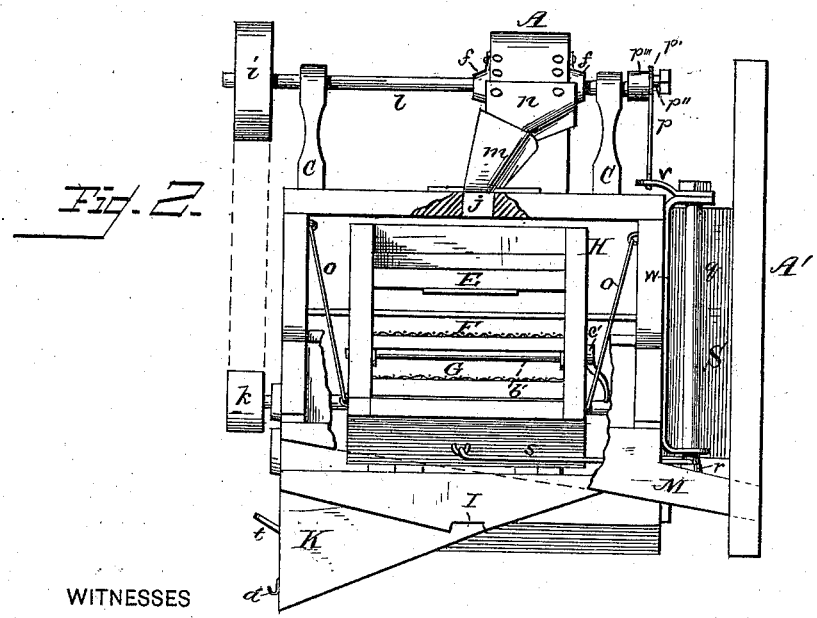
WITNESSES
F. L. Ourand
N. E. Oliphant
INVENTOR
Milford O. Meacham
per Chas H. Fowler
ATTORNEY (No Model.) 2 Sheets—Sheet 2.
M. O. MEACHAM.
RECLEANING ATTACHMENT FOR CLOVER HULLERS.
No. 276,851. Patented May 1, 1883.
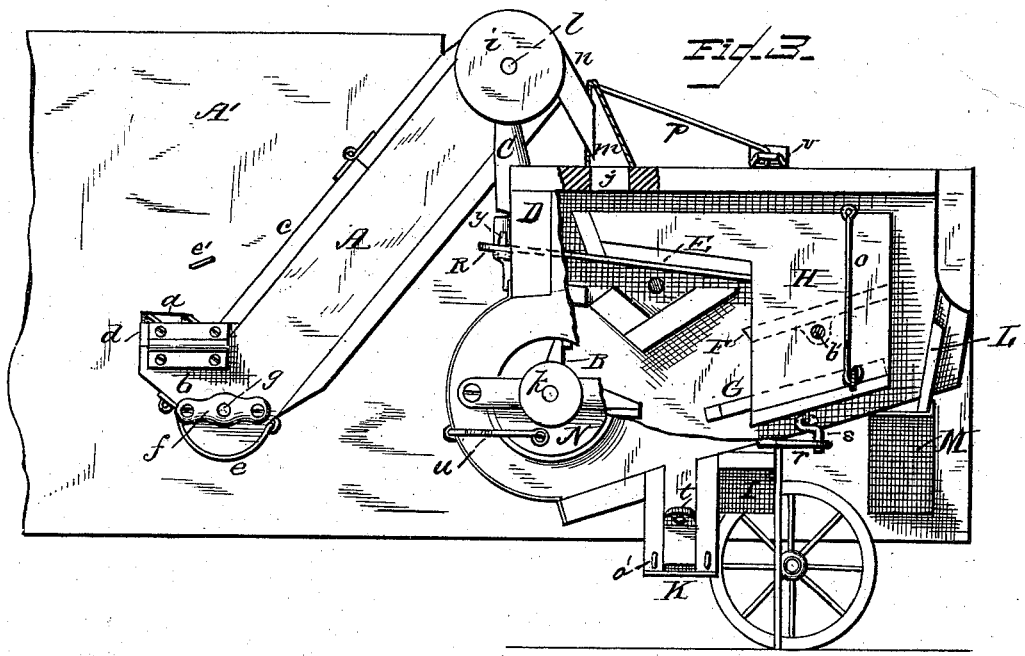
WITNESSES
J. L. Ouraud
L. L. Miller
INVENTOR
Milford O. Meacham,
per Chas. H. Fowler,
Attorney

UNITED STATES PATENT OFFICE.

MILFORD O. MEACHAM, OF RANDOLPH, OHIO.

RECLEANING ATTACHMENT FOR CLOVER-HULLERS.

SPECIFICATION forming part of Letters Patent No. 276,851, dated May 1, 1883.

Application filed January 22, 1883. (No model.)

*To all whom it may concern:*

Be it known that I, MILFORD O. MEACHAM, a citizen of the United States, residing at Randolph, in the county of Portage and State of Ohio, have invented certain new and useful Improvements in Recleaning Attachments for Clover-Hullers; and I do hereby declare that the following is a full, clear, and exact description of the same, reference being had to the annexed drawings, making a part of this specification, and to the letters and figures of reference marked thereon.

Figure 1 of the drawings is a perspective view of the device, showing it connected to the side of a clover-huller; Fig. 2, an end view thereof, partly in section, and with the frame partly broken away to show the manner of suspending the rear end of the shoe; Fig. 3, a side elevation with a portion of the frame removed and partly in section to show the interior construction; Fig. 4, a similar view of the reverse side of the device; and Fig. 5, a detail view, showing the eccentric connection between the pitman-rod and shaft.

The present invention has for its object to provide a simple, effective, and successfully-operating device for attachment to a clover-huller, whereby the grain or seed is recleaned ready for the market as rapidly as it is thrashed or hulled, thereby saving the time and trouble necessarily resulting from cleaning by hand.

The invention consists in the several details of construction substantially as shown in the drawings, and hereinafter described and claimed.

In the accompanying drawings, A' represents the side of the frame of an ordinary clover-huller to which my device is connected, as will be hereinafter described.

The inclined elevator A is of the usual construction—that is to say, it consists of an endless belt with suitable buckets attached for receiving the seed from the clover-huller and carrying it to a point of discharge at the top of the fanning-mill. The side A' of the clover-huller is provided with an incline spout, $a$, through which the seed passes from the huller into a hopper, $b$, at the lower end of the elevator A, the outer end of the spout resting upon the edge of the hopper, as more clearly shown in Fig. 4. The elevator A is provided with a hinged door, $c$, connected to the frame of the elevator at its upper end, and opens in a direction lengthwise of said elevator. The hopper $b$ is also provided with a door, $d$, which opens transversely or in an opposite direction to the door $c$, the latter being beveled at its lower end, so that when the door $d$ is first closed, and afterward the door $c$, the latter or the beveled end thereof will extend over the door $d$ and prevent it from being accidentally raised by the rapid discharge of the seed or grain through the spout $a$ into the hopper $b$. The hopper $b$ has a hinged bottom, $e$, and suitable means for fastening it closed, and when open, as shown in Fig. 4, may form a chute for discharging any surplus seed or grain remaining in the elevator after the process of recleaning has been stopped.

To the sides of the hopper $b$ are secured metal bearings $f$ for the ends of a shaft, $g$, said shaft having secured to it the usual roller, over which passes the endless belt $h$, a similar bearing being secured to each side of the elevator A, at the upper end thereof, for the purpose hereinafter described.

The elevator A carries the seed up to the fanning-mill frame D, the endless belt $h$ at the top of the elevator passing around a suitable roller in the ordinary manner, said roller being connected to a horizontal shaft, $l$, passing through bearings $f$ at the top of the elevator, with its ends supported loosely in brackets C, secured to the end of the fanning-mill frame. Motion is imparted to the endless belt $h$ by a suitable belt passing over a pulley, $i$, rigidly secured to the shaft $l$, and over a pulley, $k$, secured to the end of the shaft that carries the fan B, rotary motion being given to the shaft by a similar pulley at the opposite end thereof, and a belt passing around it and extending to the driving-power. The seed or grain as it passes from the huller enters the hopper $b$ through the spout $a$, and is carried up by the elevator A and discharged through the spout $n$ at the top thereof, passing in its course through the opening $j$ at the upper part of the frame D, and down upon the incline chute E, said chute being connected to the shoe H. The opening $j$ has an upwardly-extending hood, $m$, into which projects the end of the spout n to prevent the seed or grain from scattering and conducting it to the opening. The seed or grain, as it is deposited on the incline chute E, passes over the end thereof onto the shaking-screens F G of the shoe H, the latter having a vibratory motion given to it by means hereinafter described. The shoe H is suspended at its rear end by rods o, connected at their lower ends to the sides of the shoe, and at their opposite or upper ends to the interior sides of the frame, as shown in Fig. 2. The shoe H has imparted to it a vibratory motion by the following-described means:

To the under side of the shoe H is connected one end of a rod, s, the opposite end thereof being bent and entering one of a series of holes in an elbow, r, upon the lower end of a vertical shaft, q, said shaft having its bearings in plate w, secured to the side of the frame D, which has its ends bent at right angles.

To the upper end of the shaft q is rigidly attached a crank, v, and to which is connected one end of a pitman-rod, p, the opposite end being eccentrically connected to the horizontal shaft l. I do not confine myself to any special manner of connecting the shaft and pitman-rod together so long as they are eccentrically attached, and in such manner as will impart to the rod the required vibratory motion when the shaft rotates.

I have shown in detail, Fig. 5, one of many means that may be employed for eccentrically connecting the rod and shaft together, the rod p being formed with a collar, p', to fit over a pin, p'', extending eccentrically from a head or enlargement, p''', upon the shaft l, the latter being shown in dotted lines. As the shaft l is rotated its eccentric connection with the rod p will cause the rod to be vibrated and impart a like motion to the vertical shaft q, which, being connected to the shoe H by rod s, will give the shoe the necessary lateral vibratory motion, or a motion transversely to the line of flow of the grain or seed.

As previously stated, the elbow r of the shaft q has a series of perforations or holes for the purpose of changing the end of the rod s from one hole to another to limit or increase the extent of motion of the shoe H.

The shoe H is not only suspended at its rear end by the rods o, as hereinbefore stated, but the front of the shoe, or that portion thereof constituting the incline chute E, is suspended by a plate, R. This plate R is secured to the under side of the chute E, and passes through an elongated slot, x, in the end of the frame D, and is pivotally connected to a pin, y, secured to said frame, as shown in Fig. 1, thereby supporting the shoe H at both its front and rear ends in such manner as not to interfere with its vibratory motion.

The frame D of the fanning-mill is provided with a spout, I, for the escape of the screenings, and a spout, K, for the discharge of the clean seed, as more clearly shown in Fig. 2, the spout K being provided with hooks a' for hanging thereon a suitable bag to catch the grain or seed as it passes from the spout, a slide, t, shutting off the delivery while changing bags. The frame D has an adjustable tail-board, L, adapted to be moved up or down, as found necessary, for the purpose of saving the good seed which falls over the end of the sieves, the seed striking the tail-board in its descent and falling into the spout M, from which it may be conducted back to the clover-huller by any suitable means, and again delivered to the elevator.

The screen F is hung at a point near its middle by a rod, b', passing through the sides of the shoe H, and through depending ears upon the under side of the screen, as shown in Figs. 2 and 3. The rod b' has at one end a clamp, c', engaging with the screw-threaded end thereof, so that the screen F can be held at any desired angle by tightening the sides of the shoe against the edges of said screen by means of the rod and clamp.

The frame D of the fanning-mill is provided with valves N to regulate the inflow of air to the fan B, said valves being connected to a rod, u, for operating them. The frame D is securely fastened to the sides A' of the clover-huller by a suitable cleat, S, (shown in Figs. 2 and 4,) or, if desired, by any other desirable and convenient means.

The elevator A, near its lower end, is held suspended by the rod T, said rod having a hooked end to engage with a staple, d', upon the side of the clover-huller.

When the device is not in use the rod T is disengaged, with the staple d', after which the elevator can be swung back upon the top of the frame D, the shaft l passing loosely through the bearings in the sides of the elevator, and acts as a pivot when the same is thrown back.

If desired, a second staple, e', may be secured to the side of the clover-huller for engagement with the hooked end of the rod T, so that the elevator may be suspended directly above the spout a in place of swinging it back upon the top of the frame D.

The fanning-mill may be supported upon a suitable truck or carriage, in which case it could be brought alongside the clover-huller, and the elevator A swung down in position and held there by the rod T, the hopper b coming under the spout a, in which case it would not be necessary to secure the frame D to the side of the clover-huller.

Having now fully described my invention, what I claim as new, and desire to secure by Letters Patent, is—

1. The elevator A and clover-huller, detachably connected, in combination with the fanning-mill shoe, rotary horizontal shaft l, passing loosely through the sides of the elevator, at the upper end thereof, and operating both the endless belt of the elevator and shoe of the fanning-mill, and suitable intermediate means connecting the shaft with the shoe, substantially as and for the purpose set forth.

2. The combination, with a fanning-mill shoe and the horizontal shaft $l$, of intermediate connections between said shoe and shaft, and the elevator A, suspended at its upper end upon said shaft, and formed with doors $c$ $d$, hopper $b$, and hinged bottom $e$, substantially as and for the purpose specified.

In testimony that I claim the above I have hereunto subscribed my name in the presence of two witnesses.

MILFORD O. MEACHAM.

Witnesses:
 W. J. DICKINSON,
 ARTHUR F. DICKINSON.